INVENTOR:
David W. Kern
Philip D. Stelts

United States Patent Office 3,505,871
Patented Apr. 14, 1970

3,505,871
APPARATUS FOR DETERMINING THE TEMPERATURE OF A MOLTEN FERROUS BATH IN A BASIC OXYGEN FURNACE
David W. Kern, Slatedale, and Philip D. Stelts, Center Valley, Pa., assignors to Bethlehem Steel Corporation, a corporation of Delaware
Filed Mar. 21, 1968, Ser. No. 714,820
Int. Cl. G01k *1/14, 7/04*
U.S. Cl. 73—359      1 Claim

ABSTRACT OF THE DISCLOSURE

Apparatus for obtaining a temperature measurement of a molten ferrous bath in a basic oxygen furnace. The apparatus includes a drop-in type thermocouple mounted in the bore of a dense forged steel member. The thermocouple is connected to a recording device by a cable. The drop-in thermocouple, the dense forged steel member and cable are contained in an elongated protective tubular member.

BACKGROUND OF THE INVENTION

In the manufacture of steel in the basic oxygen furnace, molten iron, scrap and flux are charged into the furnace and a molten ferrous bath formed by blowing the charged materials with substantially pure gaseous oxygen. The process is rapid and requires the operator to know the temperature of the molten ferrous bath near the end of the refining period so that the bath may be poured at the proper temperature. Measurements of the bath temperature may be taken at a time sufficiently in advance of the end of the refining period so adjustments can be made thereto. To take the temperature measurement, it is usually necessary to stop the blow, turn the furnace down and manually insert an expendable immersion-type thermocouple into the molten ferrous bath by means of a long probe through the top of the furnace. The furnace is then returned to its blowing position. While the time required for temperature measurement is short, it does constitute a significant portion of the refining time.

Several attempts have been made to obtain the temperature of the molten ferrous bath while the vessel is in an upright position by dropping in weighted thermocouple elements. Accurate temperature measurements have been impossible because these thermocouples either did not penetrate through the slag layer atop the molten ferrous bath or float atop the molten bath itself because the weight to volume displacement was insufficient to cause the thermocouple to sink, thus giving erroneous temperature measurements.

Other attempts failed because the thermocouple was poorly packaged thereby preventing easy entrance into the furnace.

Still other methods included the use of bulky expensive externally compensated devices which added to the complexity of the apparatus.

It is the object of this invention to provide an apparatus by which accurate temperature measurements of the molten ferrous bath in a basic oxygen furnace may be made while the furnace is in an upright position.

It is a further object of this invention to provide an apparatus which will have a proper weight to volume displacement to allow the thermocouple to sink beneath the surface of the molten ferrous bath in a basic oxygen furnace to thereby assure accurate temperature measurements thereof.

It is still another object of this invention to provide apparatus for determining the temperature of a molten ferrous bath in a basic oxygen furnace which can be easily and safely transported without damaging the temperature sensitive member.

It is also an object of this invention to provide apparatus which will not require the use of any externally compensating devices to obtain accurate temperature measurements of a molten ferrous bath in a basic oxygen furnace.

SUMMARY OF THE INVENTION

Broadly, the apparatus of the invention includes a dense forged steel member having a longitudinal bore therethrough in which a thermocouple assembly is mounted. A steel strap extending beyond the thermocouple assembly is welded to the dense forged steel member to protect said thermocouple assembly. An electrical cable connects the thermocouple assembly to an external recording device. The dense forged steel member, steel strap, thermocouple assembly and electrical cable are held within an elongated protective tubular member covered at both ends.

DESCRIPTION OF THE PREFERRED EMBODIMENT

Figure 1:
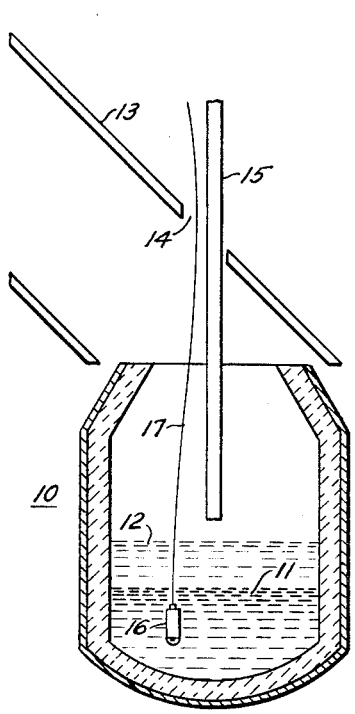
FIG. 1, is a cross-sectional view of a basic oxygen furnace showing use of the apparatus of this invention.

Referring now to the figures and in particular to FIGURE 1, a basic oxygen furnace is shown generally at 10 containing a molten ferrous bath 11 and a slag layer 12 atop the bath. Covering the furnace is a water cooled hood 13 which has a hole 14 formed therein to allow the oxygen lance 15 to be lowered into or raised out of the furnace. The drop-in thermocouple 16 of the invention falls freely through the hole in the hood into the furnace, breaks the surface of the slag and passes through the slag layer and sinks in the molten ferrous bath. The drop-in thermocouple sinks in the molten ferrous bath because the weight to volume ratio of the forged steel member to the molten ferrous bath displaced is sufficient to allow the thermocouple to sink. The drop-in thermocouple is connected to a recording device (not shown) by means of a 2-wire ruber-sheathed cable 17.

Figure 2:
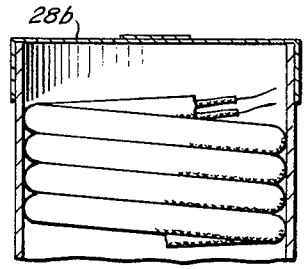
FIG. 2 is an elevation in section of the drop-in thermocouple in position in the elongated protective tubular member.
Figure 2:
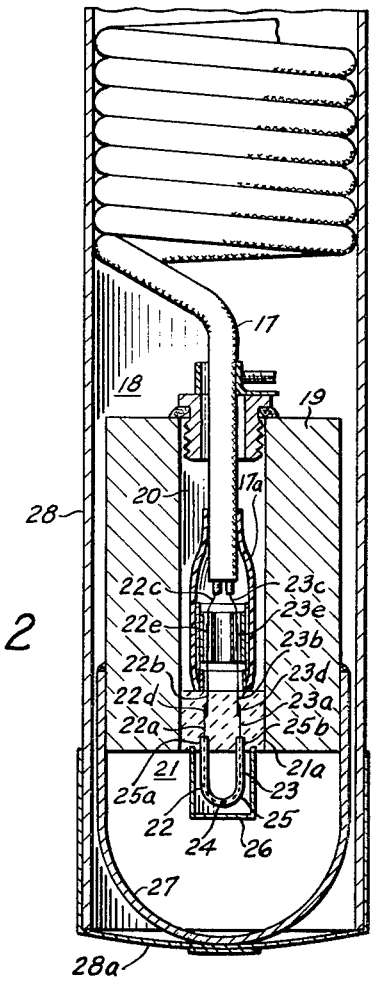

Referring now to FIG. 2, the drop-in thermocouple of the invention is shown generally at 18 and includes a dense forged steel member 19 having a longitudinal bore 20, in which a thermocouple assembly shown generally at 21 is mounted by means of an electrically insulating refractory body 21a. The thermocouple assembly 21 comprises a thermocouple element 24, usually referred to as a hot junction, formed by welding two wires 22 and 23 of dissimilar metals together. The thermocouple wires 22 and 23 extend through a thin walled tube 25 of electrically insulating heat transmitting material, for example, quartz. The ends 25a and 25b of the thin walled tube 25 are sealed in the electrically insulating refractory body 21a. The free ends 22a and 23a of the thermocouple element 24 are electrically connected to copper wires 22b and 23b by crimping or spot welding to form the cold junction 22d and 23d of the thermocouple assembly. The copper wires 22b and 23b are in turn electrically connected to the wires 22c and 23c of the cable 17 at junctions 22e and 23e which are contained in a rubber tube 17a. The wires 22c and 23c have the same composition. Although many types of two-wire rubber sheathed cable may be used, it is preferred to use a Type S cable as rated by the Underwriters Laboratory Specifications. The wires 22 and 23 may be of any suitable dissimilar metals which have physical characteristics such that a variation of temperature of from 0° F. to about 200° F. in the cold junction (the connection between the wires 22a and 23a and wires 22b and 23b) will not cause an error in the measured temperature of more than 5° F. at 2800° F. We have found that a thermocouple having one wire of 94% platinum-6% rhodium alloy and the other wire 70% platinum-30% rhodium alloy meets the aforementioned requirements. A fusible metal protective cap 26, which may be cylindrical, is placed over the thermocouple element 24 and is embedded in the refractory body 21a. A U-shaped steel strap 27 is welded to the forged steel member to form a protective shield over the thermocouple assembly 21. The forged steel member 19 and the thermocouple assembly 21 are inserted into the forward portion of an elongated protective tubular member 28. A protective cover 28a is placed over the end of the member 28 to hold the drop-in thermocouple 18 in the member 28. The rubber-sheathed cable 17 is helically wound inside the rear portion of member 28. A protective cap 28b is placed over the rear portion of the member 28 to hold the rubber-sheathed cable 17 therein. The drop-in thermocouple 18 and cable 17 may be transported and handled with comparative ease and safety when held within the member 28.

When it is required to take a temperature measurement of the molten ferrous bath in the furnace, the caps 28a and 28b are removed from either end of the elongated tubular member 28. A portion of the cable 17 is removed from the tubular member 28 and attached to a restraining means. The wires 22c and 23c are connected to a recording device. The drop-in thermocouple is removed from the forward portion of the elongated protective tubular member 28 and placed in a means for charging into the furnace. At the desired time the thermocouple is allowed to fall into the furnace. The steel strap 27 protects the thermocouple element 24 against damage when the drop-in thermocouple contacts and breaks through the slag. The density of the forged steel member 19 causes it to sink beneath the surface of the molten ferrous bath. The fusible cap 26 melts in the bath thereby exposing the thermocouple element 24 to the temperature of the molten ferrous bath. The temperature detected by the thermocouple element 24 is recorded on the aforementioned recording device.

It should be understood in this specification and claims that wherever percentages are referred to, such percentages are by weight.

We claim:
1. An apparatus for determining the temperature of a molten ferrous bath in a basic oxygen furnace comprising:
  (a) an elongated protective tubular member having a forward portion and a rear portion,
  (b) a dense forged steel member having a longitudinal bore therethrough mounted in said forward portion, the density of said member being such that the weight to volume ratio of said member is greater than that of the molten ferrous bath displaced,
  (c) a thermocouple assembly mounted in said bore comprising a pair of dissimilar wires welded together at one end to form a hot junction, each wire having a free end, said free ends of said dissimilar wires being electrically connected to a pair of similar wires to form a cold junction of the thermocouple,
  (d) a U-shaped strap attached to the forward end of said dense forged steel body, and
  (e) sheathed cable helically coiled in said rear portion of said elongated protective tubular member, the wires of said cable being electrically connected to said cold junction of said thermocouple assembly.

References Cited

UNITED STATES PATENTS

| | | | |
|---|---|---|---|
| 3,347,099 | 10/1967 | Schraeder | 73—359 |
| 3,349,613 | 10/1967 | Francis | 73—170 |
| 3,374,122 | 3/1968 | Cole | 73—359 |
| 3,396,580 | 8/1968 | Cole | 73—359 |

FOREIGN PATENTS 711,030  6/1954  Great Britain.

LOUIS R. PRINCE, Primary Examiner

D. E. CORR, Assistant Examiner

U.S. Cl. X.R.

72—343